(12) United States Patent
Horiuchi

(10) Patent No.: US 12,501,172 B2
(45) Date of Patent: Dec. 16, 2025

(54) INFRARED LIGHT PROJECTION CONTROL APPARATUS, INFRARED LIGHT PROJECTION CONTROL METHOD, AND COMPUTER-READABLE STORAGE MEDIUM STORING INFRARED LIGHT PROJECTION CONTROL PROGRAM

(71) Applicant: TOYOTA JIDOSHA KABUSHIKI KAISHA, Toyota (JP)

(72) Inventor: Sho Horiuchi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 43 days.

(21) Appl. No.: 18/597,259

(22) Filed: Mar. 6, 2024

(65) Prior Publication Data

US 2024/0314448 A1    Sep. 19, 2024

(30) Foreign Application Priority Data

Mar. 16, 2023  (JP) .................................. 2023-041578

(51) Int. Cl.
*H04N 23/74* (2023.01)
*H04N 23/71* (2023.01)
*H04N 23/72* (2023.01)
*H04N 23/73* (2023.01)
*H04N 23/76* (2023.01)

(52) U.S. Cl.
CPC ............. *H04N 23/74* (2023.01); *H04N 23/71* (2023.01); *H04N 23/72* (2023.01); *H04N 23/73* (2023.01); *H04N 23/76* (2023.01)

(58) Field of Classification Search
CPC ........ H04N 23/74; H04N 23/76; H04N 23/73; H04N 23/72; H04N 23/71
USPC ......................................................... 348/148
See application file for complete search history.

(56) References Cited

U.S. PATENT DOCUMENTS

| | | | |
|---|---|---|---|
| 9,969,261 B2 | 5/2018 | Kodama | |
| 10,045,173 B1 | 8/2018 | Morimura et al. | |
| 10,106,157 B2 | 10/2018 | Sawada et al. | |
| 10,150,407 B2 | 12/2018 | Takahashi et al. | |
| 10,696,297 B2 | 6/2020 | Nguyen Van et al. | |
| 11,001,255 B2 | 5/2021 | Fukuman et al. | |
| 11,110,937 B2 | 9/2021 | Kinoshita et al. | |
| 12,211,300 B1 * | 1/2025 | Becker | H04N 23/60 |
| 2019/0001968 A1 | 1/2019 | Yorifuji et al. | |

(Continued)

FOREIGN PATENT DOCUMENTS

JP    2020-120316 A    8/2020

*Primary Examiner* — Sath V Perungavoor
*Assistant Examiner* — Kristin Dobbs
(74) *Attorney, Agent, or Firm* — Sughrue Mion, PLLC

(57) ABSTRACT

An infrared light projection control apparatus controls a projection of infrared light from an infrared light projection device which is mounted on a vehicle and projects the infrared light onto at least a part of a surrounding of the vehicle. The infrared light projection control apparatus acquires capturing condition information corresponding to information on a capturing condition for capturing the surrounding of the vehicle by a capturing device mounted on the vehicle and acquiring images of the surrounding of the vehicle, and projects the infrared light from the infrared light projection device when the capturing condition identified by the capturing condition information satisfies a predetermined condition.

4 Claims, 5 Drawing Sheets

(56) References Cited

U.S. PATENT DOCUMENTS

| | | |
|---|---|---|
| 2019/0344828 A1 | 11/2019 | Omori et al. |
| 2019/0389488 A1 | 12/2019 | Yamada et al. |
| 2020/0244864 A1 | 7/2020 | Kida et al. |
| 2022/0338327 A1* | 10/2022 | Mochizuki ........... H05B 47/125 |

* cited by examiner

INFRARED LIGHT PROJECTION CONTROL APPARATUS, INFRARED LIGHT PROJECTION CONTROL METHOD, AND COMPUTER-READABLE STORAGE MEDIUM STORING INFRARED LIGHT PROJECTION CONTROL PROGRAM

CROSS-REFERENCE TO RELATED APPLICATIONS

This application claims priority to Japanese patent application No. JP 2023-041578 filed on Mar. 16, 2023, the content of which is hereby incorporated by reference in its entirety.

BACKGROUND

Field

The present invention relates to an infrared light projection control apparatus, an infrared light projection control method, and a computer-readable storage medium storing an infrared light projection control program.

Description of the Related Art

There is known a vehicle control apparatus which is configured to recognize a situation around a vehicle based on images of a surrounding of the vehicle captured by an in-vehicle camera, and assist an operation of a driver to drive the vehicle and automatically park the vehicle based on the recognized situation. It should be noted that a vehicle control relating to a parking of a vehicle is specified by a standard ISO 20900 (Partially automated parking systems: PAPS) and a standard ISO 16787 (Assisted parking systems: APS).

Further, when it is dark around the vehicle, and luminance of images captured by in-vehicle cameras is low, situations around the vehicle may not be exactly recognized. In this regard, there is also known an infrared light projection control apparatus which is configured to acquire the image having high luminance by projecting infrared light around the vehicle as needed. As such an infrared light projection control apparatus, there is known an infrared light projection control apparatus which is configured to acquire luminance histogram of the images captured by the in-vehicle cameras and determine whether projecting the infrared light is needed based on the acquired luminance histogram (for example, refer to JP 2020-120316 A).

When determining a necessity of projecting the infrared light based on information such as the luminance histogram acquired from the images, there is a potential for differences in determination result of the necessity of projecting the infrared light between a situation where high-luminance reflective objects are in the image and a situation where low-luminance reflective objects are in the image even when darkness is the same. As a result, the infrared light may not be projected when the infrared light needs to be projected, and the infrared light may be projected when the infrared light does not need to be projected.

SUMMARY

An object of the present invention is to provide an infrared light projection control apparatus, an infrared light projection control method, and a computer-readable storage medium storing an infrared light projection control program.

According to the present invention, an infrared light projection control apparatus comprises an electronic control unit configured to control a projection of infrared light from an infrared light projection device which is mounted on a vehicle and projects the infrared light onto at least a part of a surrounding of the vehicle. The electronic control unit is configured to acquire capturing condition information corresponding to information on a capturing condition for capturing the surrounding of the vehicle by a capturing device mounted on the vehicle and acquiring images of the surrounding of the vehicle. In addition, the electronic control unit is configured to project the infrared light from the infrared light projection device when the capturing condition identified by the capturing condition information satisfies a predetermined condition.

With the infrared light projection control apparatus according to the present invention, the necessity of projecting the infrared light is determined based on the capturing condition information. Therefore, the necessity of projecting the infrared light around the vehicle can be determined not based on information directly acquired from the images.

According to an aspect of the present invention, the capturing condition information may correspond to information on an exposure period of time for which the capturing device captures, and a gain value of the capturing device to acquire the images. In this aspect, the predetermined condition may correspond to a condition that the exposure period of time has reached a maximum exposure period of time, and the gain value has reached a maximum gain value.

With the infrared light projection control apparatus according to this aspect of the present invention, the necessity of projecting the infrared light around the vehicle is determined based on the exposure period of time and the gain value.

Further, according to another aspect of the present invention, the infrared light projection control apparatus may comprise a storage device. In this aspect, the maximum exposure period of time and the maximum gain value may be stored in the storage device.

With the infrared light projection control apparatus according to this aspect of the present invention, the necessity of projecting the infrared light around the vehicle is determined based on the maximum exposure period of time and the maximum gain value stored in the storage device.

According to the present invention, an infrared light projection control method is a method of controlling a projection of infrared light from an infrared light projection device which is mounted on a vehicle and projects the infrared light onto at least a part of a surrounding of the vehicle. Further, the infrared limit projection control method comprises steps of acquiring capturing condition information corresponding to information on a capturing condition for capturing the surrounding of the vehicle by a capturing device mounted on the vehicle and acquiring images of the surrounding of the vehicle, and projecting the infrared light from the infrared light projection device when the capturing condition identified by the capturing condition information satisfies a predetermined condition.

With the infrared light projection control method according to the present invention, the necessity of projecting the infrared light around the vehicle can be determined not based on information directly acquired from the images for the aforementioned reasons.

According to the present invention, a computer-readable storage medium stores an infrared light projection control program of controlling a projection of infrared light from an infrared light projection device which is mounted on a vehicle and projects the infrared light onto at least a part of a surrounding of the vehicle. The infrared light projection control program is configured to acquire capturing condition information corresponding to information on a capturing condition for capturing the surrounding of the vehicle by a capturing device mounted on the vehicle and acquiring images of the surrounding of the vehicle. In addition, the infrared light projection control program is configured to project the infrared light from the infrared light projection device when the capturing condition identified by the capturing condition information satisfies a predetermined condition.

With the infrared light projection control program according to the present invention, the necessity of projecting the infrared light around the vehicle can be determined not based on information directly acquired from the images for the aforementioned reasons.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Hereinafter, a vehicle control apparatus including an infrared light projection control apparatus according to an embodiment of the present invention will be described with reference to the drawings. A technology of the present invention described below is a technology applicable to a technology conforming to a standard ISO 20900 (Partially automated parking systems:PAPS) and a standard ISO 16787(Assisted parking systems:APS).

Figure 1:
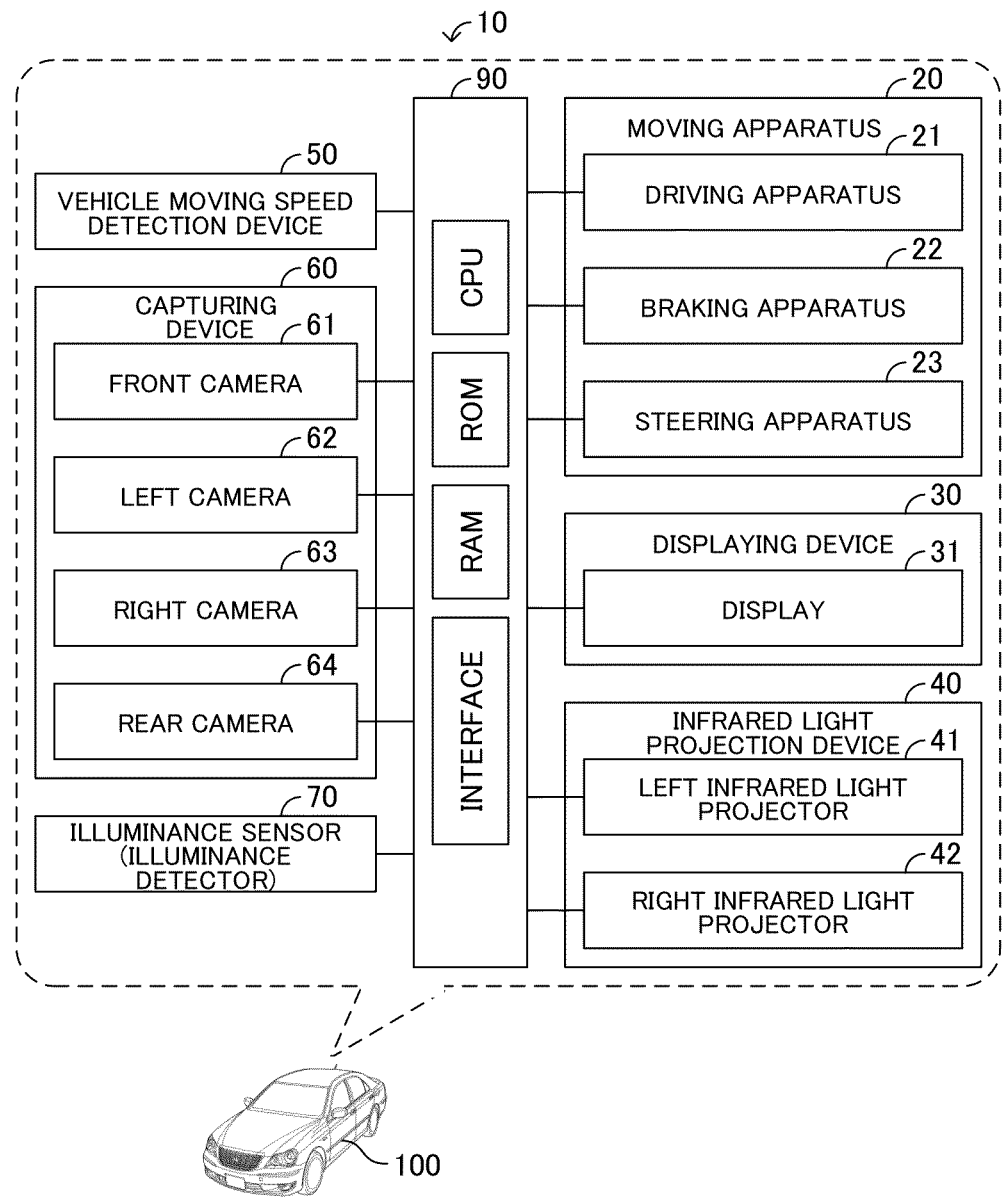
FIG. 1 is a view which shows a vehicle control apparatus having a configuration according to an embodiment of the present invention.

FIG. 1 shows the vehicle control apparatus 10 according to the embodiment of the present invention. The vehicle control apparatus 10 is mounted on an own vehicle 100. Hereinafter, the vehicle control apparatus 10 will be described by exemplifying that an operator of the own vehicle 100 is a driver of the own vehicle 100, i.e., a person who is in the own vehicle 100 and drives the own vehicle 100.

However, the operator of the own vehicle 100 may be a remote operator of the own vehicle 100, i.e., an operator who is not in the own vehicle 100 but remotely drives the own vehicle 100. When the operator of the own vehicle 100 is the remote operator, the vehicle control apparatus 10 is mounted on the own vehicle 100 and a remote operation facility installed outside the own vehicle 100 for remotely driving the own vehicle 100, and functions of the vehicle control apparatus 10 described below are realized by the vehicle control apparatus 10 mounted on the own vehicle 100 and the vehicle control apparatus 10 mounted on the remote operation facility.

As shown in FIG. 1, the vehicle control apparatus 10 includes an ECU (electronic control device) 90 as a control device. The ECU 90 includes a microcomputer as a main component. The microcomputer includes a CPU, a storage medium (storage device) such as a ROM, a RAM and a non-volatile memory, an interface, and the like. The CPU is configured or programmed to realize various functions by executing instructions, programs, or routines stored in the storage medium. In particular, in the present embodiment, the vehicle control apparatus 10 stores, in the storage medium (the storage device), a program for realizing various kinds of control executed by the vehicle control apparatus 10.

It should be noted that the vehicle control apparatus 10 may be configured to be able to update the programs stored in the storage medium by wireless communication (for example, Internet communication) with external devices.

Further, the present invention is applicable to any of a vehicle that can be driven by manual driving operation and automatic driving control, a vehicle that is driven only by the manual driving operation, and a vehicle that is driven only by the automatic driving control. The manual driving operation is a driving operation performed by the operator to drive the vehicle. The automatic driving control is a control in which a control device such as an ECU automatically causes the vehicle to move without the operator performing a driving operation for causing the vehicle to move.

Further, in the present embodiment, the vehicle control apparatus 10 includes only one ECU 90, but may include a plurality of ECUs, and may be configured to share the functions of the vehicle control apparatus 10 described below by the respective ECUs.

Figure 2:
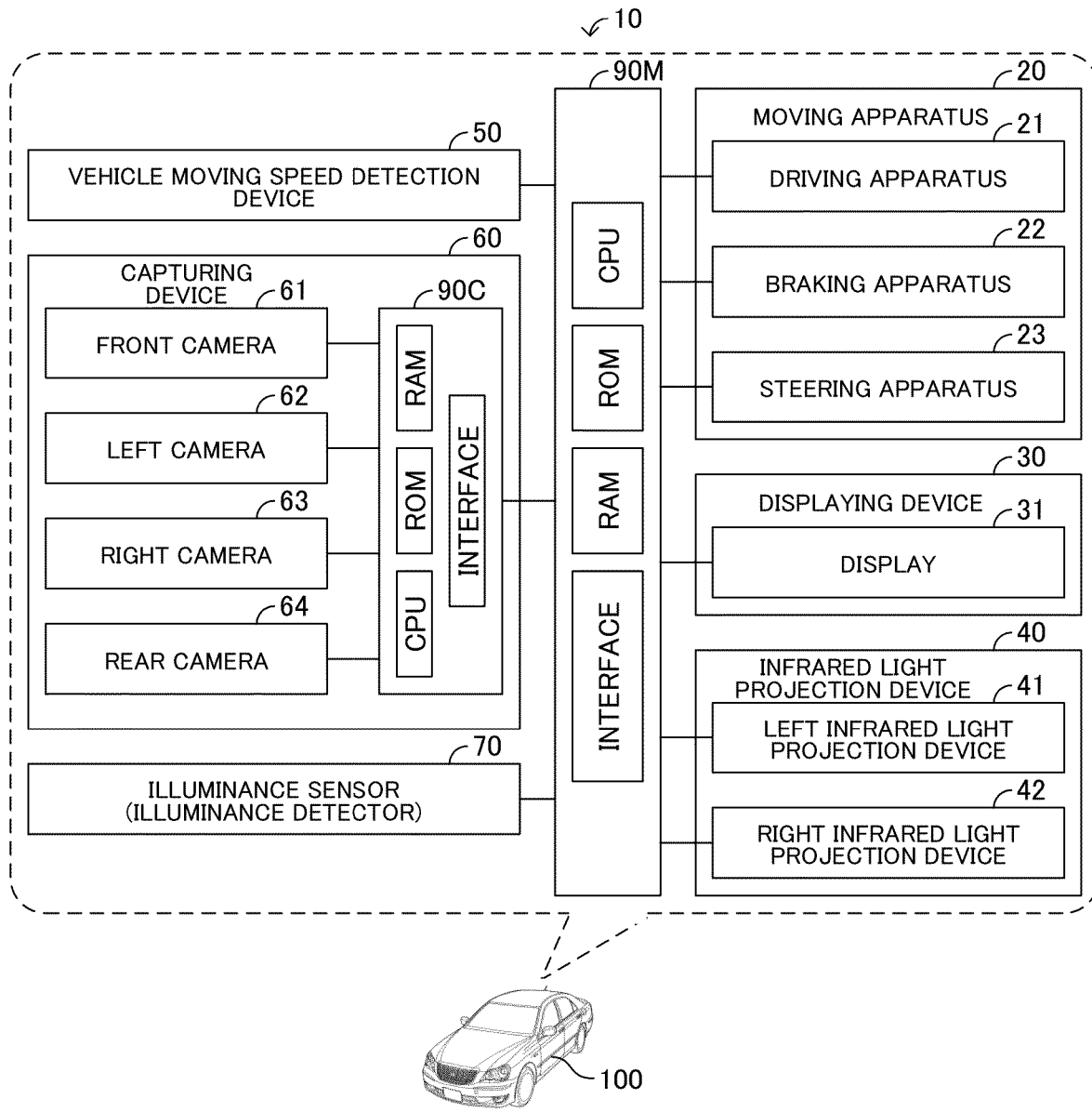
FIG. 2 is a view which shows a vehicle control apparatus having another configuration according to the embodiment of the present invention.

For example, as shown in FIG. 2, the vehicle control apparatus 10 may include a main ECU 90M and a camera ECU 90C.

The own vehicle 100 is equipped with a moving apparatus 20. The moving apparatus 20 is a device for moving the own vehicle 100, and in the present embodiment, includes a driving apparatus 21, a braking apparatus 22, and a steering apparatus 23.

The driving apparatus 21 is an apparatus which applies a driving force to the own vehicle 100, and includes, for example, an internal combustion engine and/or at least one electric motor. The driving apparatus 21 is electrically connected to the ECU 90. The vehicle control apparatus 10 controls the driving force applied to the own vehicle 100 by controlling operations of the driving apparatus 21.

The braking apparatus 22 is an apparatus which applies a braking force to the own vehicle 100, and is, for example, a hydraulic braking apparatus. The braking apparatus 22 is electrically connected to the ECU 90. The vehicle control apparatus 10 controls the braking force applied to the own vehicle 100 by controlling operations of the braking apparatus 22.

The steering apparatus 23 is an apparatus which applies a steering force to the own vehicle 100, and is, for example, a power steering apparatus. The steering apparatus 23 is electrically connected to the ECU 90. The vehicle control apparatus 10 controls the steering force applied to the own vehicle 100 by controlling operations of the steering apparatus 23.

Further, the own vehicle 100 is equipped with a displaying device 30 and an infrared light projection device 40.

The displaying device 30 is a device which displays various images, and includes a display 31 in the present embodiment. The display 31 is electrically connected to the ECU 90. The vehicle control apparatus 10 can display various images on the display 31.

Figure 3A:
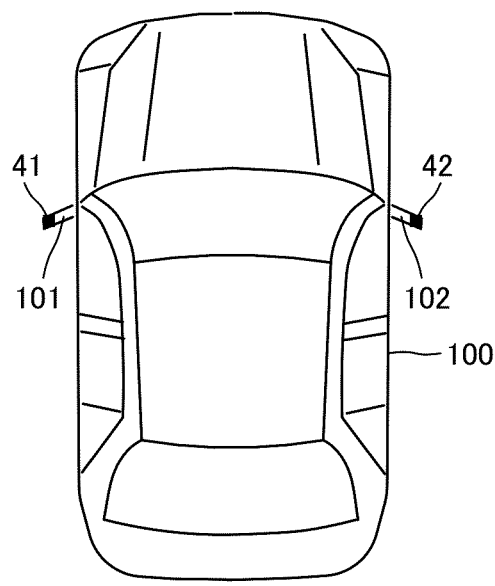
FIG. 3A is a view which shows an infrared light projection device.

The infrared light projection device 40 is a device which projects or irradiates infrared light around the own vehicle 100, and includes a left infrared light projection device 41 and a right infrared light projection device 42 in the present embodiment. As shown in FIG. 3A, the left infrared light projection device 41 is mounted to a left side mirror 101 of the own vehicle 100 to project the infrared light to a left side of the own vehicle 100. The right infrared light projection device 42 is mounted to a right side mirror 102 of the own vehicle 100 to project the infrared light to a right side of the own vehicle 100.

The left infrared light projection device 41 and the right infrared light projection device 42 are electrically connected to the ECU 90. The vehicle control apparatus 10 can project the infrared light to the left side of the own vehicle 100 or stop a projection of the infrared light from the left infrared light projection device 41 by controlling operations of the left infrared light projection device 41. Similarly, the vehicle control apparatus 10 can project the infrared light to the right side of the own vehicle 100 or stop a projection of the infrared light from the right infrared light projection device 42 by controlling operations of the right infrared light projection device 42.

Further, the own vehicle 100 is equipped with a vehicle speed detection device 50, a capturing device 60, and an illuminance sensor 70 as an illuminance detector.

The vehicle speed detection device 50 is a device which detects a moving speed of the own vehicle 100, and includes, for example, vehicle wheel rotation speed sensors which detect rotational speeds of vehicle wheels of the own vehicle 100, respectively. The vehicle speed detection device 50 is electrically connected to the ECU 90. The vehicle control apparatus 10 acquires the moving speed of the own vehicle 100 as an own vehicle speed V by the vehicle speed detection device 50.

The capturing device 60 is a device which images and captures images of a surrounding of the own vehicle 100 and acquires image data on the surrounding of the own vehicle 100.

In a situation where the vehicle control apparatus 10 is configured as shown in FIG. 1, the capturing device 60 includes a front camera 61 as a front capturing device, a left camera 62 as a left capturing device, a right camera 63 as a right capturing device, and a rear camera 64 as a rear capturing device.

On the other hand, in a situation where the vehicle control apparatus 10 is configured as shown in FIG. 2, the capturing device 60 includes the front camera 61, the left camera 62, the right camera 63, and the rear camera 64, and also includes the camera ECU 90C.

Figure 3B:
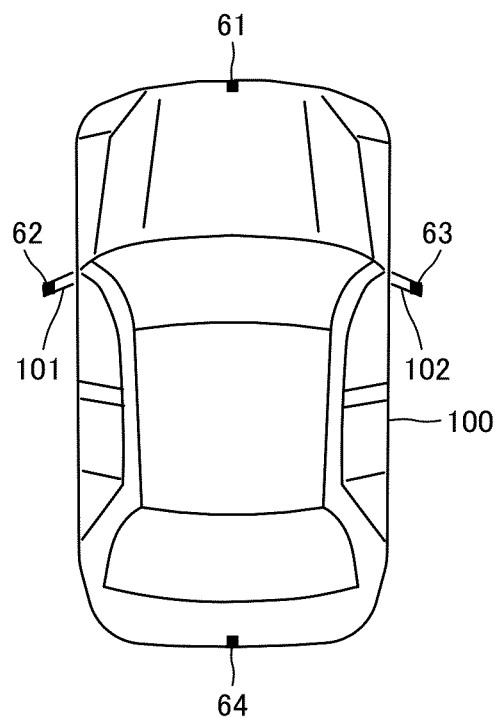
FIG. 3B is a view which shows a capturing device.

As shown in FIG. 3B, the front camera 61 is mounted on a front side portion of the own vehicle 100 to image and capture images of a view ahead of the own vehicle 100. The left camera 62 is mounted to a left side portion of the own vehicle 100 (in particular, the left side mirror 101) to image and capture images of a view on a left side of the own vehicle 100. The right camera 63 is mounted to a right side portion of the own vehicle 100 (in particular, the right side mirror 102) to image and capture images of a view on a right side of the own vehicle 100. The rear camera 64 is mounted on a rear portion of the own vehicle 100 to image and capture images of a view behind the own vehicle 100.

In a situation where the vehicle control apparatus 10 is configured as shown in FIG. 1, the front camera 61, the left camera 62, the right camera 63, and the rear camera 64 are electrically connected to the ECU 90. On the other hand, in a situation where the vehicle control apparatus 10 is configured as shown in FIG. 2, the front camera 61, the left camera 62, the right camera 63, and the rear camera 64 are electrically connected to the camera ECU 90C. The camera ECU 90C is electrically connected to the main ECU 90M.

The vehicle control apparatus 10 acquires front images, i.e., the images of the view ahead of the own vehicle 100 by the front camera 61, acquires left images, i.e., the images of the view on the left side of the own vehicle 100 by the left camera 62, acquires right images, i.e., the images of the view on the right side of the own vehicle 100 by the right camera 63, and acquires rear images, i.e., the images of the view behind the own vehicle 100 by the rear camera 64.

The illuminance sensor 70 is a device which detects illuminance of the surrounding of the own vehicle 100. The illuminance sensor 70 is electrically connected to the ECU 90. The vehicle control apparatus 10 detects the illuminance of the surrounding of the own vehicle 100 as an illuminance IM by the illuminance sensor 70.

<Operations of Vehicle Control Apparatus>

Next, operations of the vehicle control apparatus 10 will be described. The vehicle control apparatus 10 is configured to execute a routine shown in FIG. 4 at a predetermined calculation cycle. Therefore, at a predetermined point of time, the vehicle control apparatus 10 starts a process from a step S400 of the routine shown in FIG. 4 and proceeds with the process to a step S405 to acquire the illuminance IM at that time.

Next, the vehicle control apparatus 10 proceeds with the process to a step S410 to set an exposure period of time T based on the illuminance IM acquired at the step S405. The exposure period of time T is an exposure period of time for which the capturing device 60 captures. It should be noted that in a situation where the vehicle control apparatus 10 is configured as shown in FIG. 1, the ECU 90 sets the exposure period of time T. On the other hand, in a situation where the vehicle control apparatus 10 is configured as shown in FIG. 2, the camera ECU 90C sets the exposure period of time T.

Figure 4:
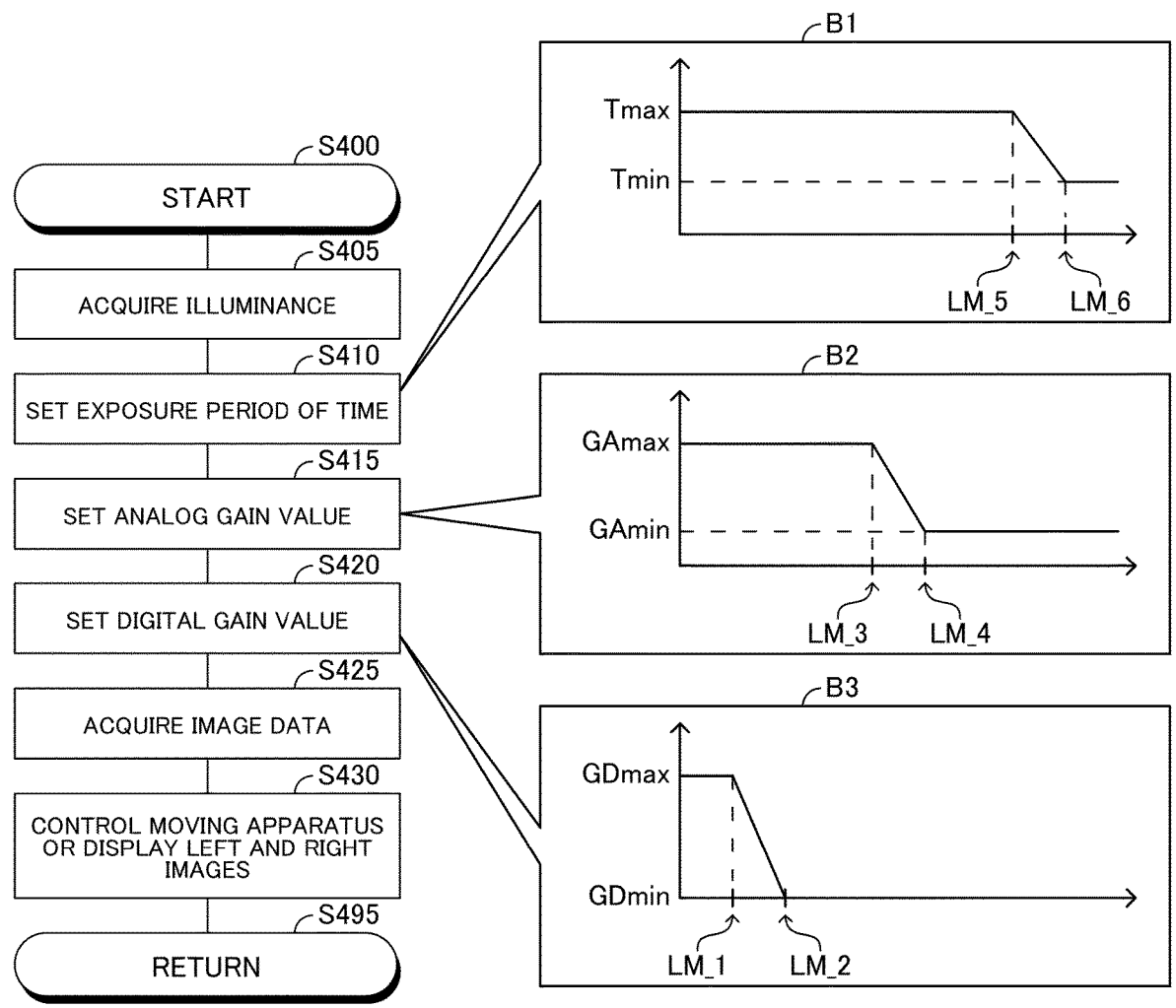
FIG. 4 is a view which shows a flowchart of a routine executed by the vehicle control apparatus according to the embodiment of the present invention.

As shown in blocks B1 to B3 in FIG. 4, a first illuminance threshold $IM\_1$, a second illuminance threshold $IM\_2$, a third illuminance threshold $IM\_3$, a fourth illuminance threshold $IM\_4$, a fifth illuminance threshold $IM\_5$, and a sixth illuminance threshold $IM\_6$ are prepared as threshold values of the illuminance IM. In the present embodiment, the first illuminance threshold $IM\_1$ is smaller than the second illuminance threshold $IM\_2$, the second illuminance threshold $IM\_2$ is smaller than the third illuminance threshold $IM\_3$, the third illuminance threshold $IM\_3$ is smaller than the fourth illuminance threshold $IM\_4$, the fourth illuminance threshold $IM\_4$ is smaller than the fifth illuminance threshold $IM\_5$, and the fifth illuminance threshold $IM\_5$ is smaller than the sixth illuminance threshold $IM\_6$ ($IM\_1 < IM\_2 < IM\_3 < IM\_4 < IM\_5 < IM\_6$).

As shown in the block B1 in FIG. 4, when the illuminance IM acquired at the step S405 is equal to or greater than the sixth illuminance threshold $IM\_6$, the vehicle control apparatus 10 sets a minimum exposure period of time Tmin as the exposure period of time T. When the illuminance IM acquired at the step S405 is smaller than the sixth illuminance threshold $IM\_6$ and equal to or greater than the fifth illuminance threshold $IM\_5$, the vehicle control apparatus 10 sets as the exposure period of time T, a period of time which is longer than the minimum exposure period of time Tmin and becomes longer as the illuminance IM decreases. When the illuminance IM acquired at the step S405 is smaller than the fifth illuminance threshold IM_5, the vehicle control apparatus 10 sets a maximum exposure period of time Tmax as the exposure period of time T. The maximum exposure period of time Tmax is a period of time longer than the minimum exposure period of time Tmin. In an example shown in FIG. 4, the minimum exposure period of time Tmin is a period of time longer than zero.

Next, the vehicle control apparatus 10 proceeds with the process to a step S415 to set an analog gain value GA based on the illuminance IM acquired at the step S405. The analog gain value GA is a gain value (i.e., a value of gain) for adjusting a luminance of the image for acquiring the image by the capturing device 60, and in the present embodiment, in particular, is a value of the so-called analog gain for amplifying charge when light exposed by an image sensor of the capturing device 60 is converted into the charge. In a situation where the vehicle control apparatus 10 is configured as shown in FIG. 1, the ECU 90 sets the analog gain value GA. On the other hand, in a situation where the vehicle control apparatus 10 is configured as shown in FIG. 2, the camera ECU 90C sets the analog gain value GA.

As shown in the block B2 in FIG. 4, when the illuminance IM acquired at the step S405 is equal to or greater than the fourth illuminance threshold IM_4, the vehicle control apparatus 10 sets a minimum gain value (or a minimum analog gain value GAmin) as the analog gain value GA. When the illuminance IM acquired at the step S405 is smaller than the fourth illuminance threshold IM_4 and is equal to or greater than the third illuminance threshold IM_3, the vehicle control apparatus 10 sets as the analog gain value GA, a value which is greater than the minimum analog gain value GAmin and becomes greater as the illuminance IM decreases. When the illuminance IM acquired at the step S405 is smaller than the third illuminance threshold IM_3, the vehicle control apparatus 10 sets a maximum gain value (or a maximum analog gain value GAmax) as the analog gain value GA. It should be noted that the maximum analog gain value GAmax is a value greater than the minimum analog gain value GAmin. Further, in the example shown in FIG. 4, the minimum analog gain value GAmin is a value greater than zero.

Next, the vehicle control apparatus 10 proceeds with the process to a step S420 to set a digital gain value GD based on the illuminance IM acquired at the step S405. The digital gain value GD is a gain value (i.e., a value of gain) for adjusting the luminance of the image for acquiring the image by the capturing device 60, and in the present embodiment, in particular, is a value of the so-called digital gain for amplifying the luminance value data acquired by a software calculation. It should be noted that in a situation where the vehicle control apparatus 10 is configured as shown in FIG. 1, the ECU 90 sets the digital gain value GD. On the other hand, in a situation where the vehicle control apparatus 10 is configured as shown in FIG. 2, the camera ECU 90C sets the digital gain value GD.

As shown in the block B3 in FIG. 4, when the illuminance IM acquired at the step S405 is equal to or greater than the second illuminance threshold IM_2, the vehicle control apparatus 10 sets a minimum gain value (i.e., a minimum digital gain value GDmin) as the digital gain value GD. When the illuminance IM acquired at the step S405 is smaller than the second illuminance threshold IM_2 and is equal to or greater than the first illuminance threshold IM_1, the vehicle control apparatus 10 sets as the digital gain value GD, a value which is greater than the minimum digital gain value GDmin and becomes greater as the illuminance IM decreases. When the illuminance IM acquired at the step S405 is smaller than the first illuminance threshold IM_1, the vehicle control apparatus 10 sets a maximum gain value (i.e., a maximum digital gain value GDmax) as the digital gain value GD. The maximum digital gain value GDmax is a value greater than the minimum digital gain value GDmin. Further, in the example shown in FIG. 4, the minimum digital gain value GDmin is zero.

Next, the vehicle control apparatus 10 proceeds with the process to a step S425 to (i) perform imaging by the capturing device 60 for the exposure period of time T set at the step S410, (ii) correct the image captured by the capturing device 60 with the analog gain value GA set at the step S415 and the digital gain value GD set at the step S420, and (iii) acquire the corrected image as a vehicle surrounding image.

Next, the vehicle control apparatus 10 proceeds with the process to a step S430 to execute an automatic parking control, using the vehicle surrounding image acquired at the step S425 when the vehicle control apparatus 10 is executing the automatic parking control is executed at that time.

In particular, the automatic parking control is a control for causing the own vehicle 100 to automatically park in a parking space by (i) detecting line markings such as white lines which define the parking space from the vehicle surrounding image, (ii) identifying the parking space based on the detected line markings, (iii) acquiring a positional relationship between the identified parking space and the own vehicle 100, (iv) determining control values for the moving apparatus 20 for moving the own vehicle 100 toward the identified parking space in order to park the own vehicle 100 in the identified parking space based on the acquired positional relationship, and (v) controlling the operations of the moving apparatus 20 based on the determined control values. Therefore, the automatic parking control is one of automatic driving controls.

On the other hand, when the driver is parking the own vehicle 100 in the parking space by manual driving at a point of time when the vehicle control apparatus 10 proceeds with the process to the step S430, the vehicle control apparatus 10 displays the vehicle surrounding image acquired at the step S425, i.e., one or more of the front image, the left image, the right image, and the rear image of the own vehicle 100 on the display 31.

Then, the vehicle control apparatus 10 proceeds with the process to a step S495 to terminate executing this routine once.

Figure 5:
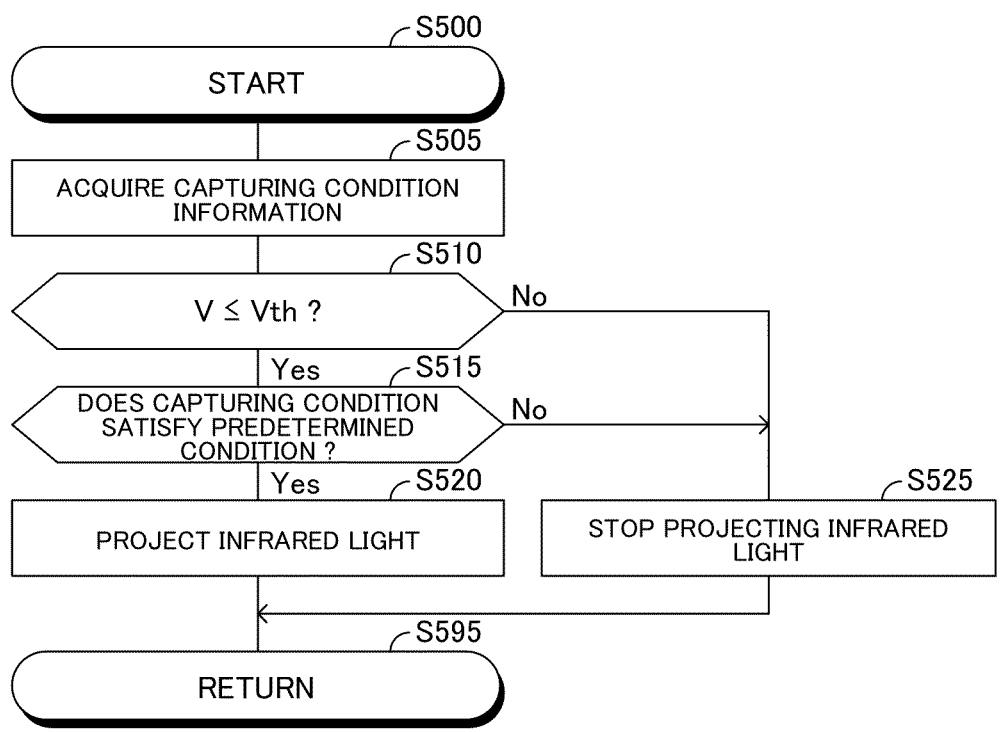
FIG. 5 is a view which shows a flowchart of a routine executed by the vehicle control apparatus according to the embodiment of the present invention.

Further, the vehicle control apparatus 10 is configured to execute a routine shown in FIG. 5 at the predetermined calculation cycle. Therefore, at a predetermined point of time, the vehicle control apparatus 10 starts a process from a step S500 of the routine shown in FIG. 5 and proceeds with the process to a step S505 to acquire capturing condition information IF_CI.

The capturing condition information IF_CI is at least information related to a condition for acquiring a final image, rather than information acquired from the acquired image itself, such as the luminance value of the finally acquired image. In other words, the capturing condition information IF_CI is information related to a capturing condition CI for imaging and capturing the image of the surrounding of the own vehicle 100 by the capturing device 60.

In the present embodiment, in a situation where the vehicle control apparatus 10 is configured as shown in FIG. 1, the capturing condition information IF_CI corresponds to (i) the exposure period of time T as information related to an exposure condition, (ii) the analog gain value GA as information related to an analog correction condition, and (iii) the digital gain value GD as information related to a digital correction condition.

In this case, the vehicle control apparatus 10 stores in advance the maximum exposure period of time Tmax, the maximum analog gain value GAmax, and the maximum digital gain value GDmax for the capturing device 60 currently installed in the own vehicle 100. That is, the ECU 90 previously stores in the storage device, the maximum exposure period of time Tmax, the maximum analog gain value GAmax, and the maximum digital gain value GDmax for the capturing device 60 currently installed in the own vehicle 100.

In addition, in a situation where the vehicle control apparatus 10 is configured as shown in FIG. 2, and (i) the exposure period of time T, (ii) the analog gain value GA, and (iii) the digital gain value GD are provided from the camera ECU 90C to the main ECU 90M, the capturing condition information IF_CI corresponds to (i) the exposure period of time T as the information related to the exposure condition, (ii) the analog gain value GA as the information related to the analog correction condition, and (iii) the digital gain value GD as the information related to the digital correction condition.

In this case, the vehicle control apparatus 10 stores in advance the maximum exposure period of time Tmax, the maximum analog gain value GAmax, and the maximum digital gain value GDmax for the capturing device 60 currently installed in the own vehicle 100. That is, the main ECU 90M previously stores in the storage device, the maximum exposure period of time Tmax, the maximum analog gain value GAmax, and the maximum digital gain value GDmax for the capturing device 60 currently installed in the own vehicle 100.

Further, in a situation where the vehicle control apparatus 10 is configured as shown in FIG. 2, and (i) maximum exposure information IF_T (i.e., information indicating that the exposure period of time T has reached the maximum exposure period of time Tmax), (ii) maximum analog gain information IF_GA (i.e., information indicating that the analog gain value GA has reached the maximum analog gain value Gamax), and (iii) maximum digital gain information IF_GD (i.e., information indicating that the digital gain value GD has reached the maximum digital gain value GDmax) are provided from the camera ECU 90C to the main ECU 90M, the capturing condition information IF_CI corresponds to (i) the maximum exposure information IF_T as the information related to the exposure condition, (ii) the maximum analog gain information IF_GA as the information related to the analog correction condition, and (iii) the maximum digital gain information IF_GD as the information related to the digital correction condition.

In this case, the vehicle control apparatus 10 does not need to store in advance the maximum exposure period of time Tmax, the maximum analog gain value GAmax, and the maximum digital gain value GDmax for the capturing device 60 currently installed in the own vehicle 100. That is, the main ECU 90M does not need to previously store in the storage device, the maximum exposure period of time Tmax, the maximum analog gain value GAmax, and the maximum digital gain value GDmax for the capturing device 60 currently installed in the own vehicle 100.

Next, the vehicle control apparatus 10 proceeds with the process to a step S510 to determine whether the own vehicle speed V is equal to or lower than a predetermined vehicle speed Vth. It should be noted that a process of the S510 may be omitted. In this case, the vehicle control apparatus 10 proceeds with the process directly to a step S515 when the vehicle control apparatus 10 determines "Yes" at the step S505.

When the vehicle control apparatus 10 determines "Yes" at the step S510, the vehicle control apparatus 10 proceeds with the process to the step S515 to determine whether the capturing condition CI satisfies a predetermined condition Cth. The capturing condition CI is a condition indicated by the capturing condition information IF_CI.

In the present embodiment, in a situation where the vehicle control apparatus 10 is configured as shown in FIG. 1, or in a situation where the vehicle control apparatus 10 is configured as shown in FIG. 2, and (i) the exposure period of time T, (ii) the analog gain value GA, and (iii) the digital gain value GD are provided from the camera ECU 90C to the main ECU 90M, the vehicle control apparatus 10 determines that the capturing condition CI satisfies the predetermined condition Cth when (i) the exposure period of time T has reached the maximum exposure period of time Tmax, (ii) the analog gain value GA has reached the maximum analog gain value GAmax, and (iii) the digital gain value GD has reached the maximum digital gain value GDmax.

Further, in a situation where the vehicle control apparatus 10 is configured as shown in FIG. 2, and (i) the maximum exposure information IF_T, (ii) the maximum analog gain information IF_GA, and (iii) the maximum digital gain information IF_GD are provided from the camera ECU 90C to the main ECU 90M, the vehicle control apparatus 10 determines that the capturing condition CI satisfies the predetermined condition Cth when (i) the maximum exposure information IF_T, (ii) the maximum analog gain information IF_GA, and (iii) the maximum digital gain information IF_GD have been provided from the camera ECU 90C to the main ECU 90M.

It should be noted that in a situation where the vehicle control apparatus 10 is configured as shown in FIG. 1, or in a situation where the vehicle control apparatus 10 is configured as shown in FIG. 2, and (i) the exposure period of time T, (ii) the analog gain value GA, and (iii) the digital gain value GD are provided from the camera ECU 90C to the main ECU 90M, the vehicle control apparatus 10 may be configured to determine whether the capturing condition CI satisfies the predetermined condition Cth based on any one of (i) the exposure period of time T, (ii) the analog gain value GA, and (iii) the digital gain value GD.

For example, in the present embodiment, the exposure period of time T has reached the maximum exposure period of time Tmax, and the analog gain value GA has reached the maximum analog gain value GAmax when the digital gain value GD has reached the maximum digital gain value GDmax.

Therefore, in a situation where the vehicle control apparatus 10 is configured as shown in FIG. 1, the vehicle control apparatus 10 may be configured to determine at the step S515 that the capturing condition CI satisfies the predetermined condition Cth when the digital gain value GD has reached the maximum digital gain value GDmax.

Further, in a situation where the vehicle control apparatus 10 is configured as shown in FIG. 2, the vehicle control apparatus 10 may be configured to provide the digital gain value GD from the camera ECU 90C to the main ECU 90M. In this case, the vehicle control apparatus 10 may be configured to determine at the step S515 that the capturing condition CI satisfies the predetermined condition Cth when the digital gain value GD has reached the maximum digital gain value GDmax.

Furthermore, in a situation where the vehicle control apparatus 10 is configured as shown in FIG. 2, the vehicle control apparatus 10 may be configured to provide the maximum digital gain information IF_GD from the camera ECU 90C to the main ECU 90M. In this case, the vehicle control apparatus 10 may be configured to determine at the step S515 that the capturing condition CI satisfies the predetermined condition Cth when the maximum digital gain information IF_GD has been provided from the camera ECU 90C to the main ECU 90M.

Alternatively, in a situation where the vehicle control apparatus 10 is configured as shown in FIG. 1, the vehicle control apparatus 10 may be configured to determine at the step S515 that the capturing condition CI satisfies the predetermined condition Cth without considering the exposure period of time T and the digital gain value GD when the analog gain value GA has reached the maximum analog gain value GAmax.

Further, in a situation where the vehicle control apparatus 10 is configured as shown in FIG. 2, the vehicle control apparatus 10 may be configured to provide the analog gain value GA from the camera ECU 90C to the main ECU 90M. In this case, the vehicle control apparatus 10 may be configured to determine at the step S515 that the capturing condition CI satisfies the predetermined condition Cth without considering the exposure period of time T and the digital gain value GD when the analog gain value GA has reached the maximum analog gain value GAmax.

Furthermore, in a situation where the vehicle control apparatus 10 is configured as shown in FIG. 2, the vehicle control apparatus 10 may be configured to provide the maximum analog gain information IF_GA from the camera ECU 90C to the main ECU 90M. In this case, the vehicle control apparatus 10 may be configured to determine at the step S515 that the capturing condition CI satisfies the predetermined condition Cth without considering the exposure period of time T and the digital gain value GD when the maximum analog gain information IF_GA has been provided from the camera ECU 90C to the main ECU 90M.

Alternatively, in a situation where the vehicle control apparatus 10 is configured as shown in FIG. 1, the vehicle control apparatus 10 may be configured to determine at the step S515 that the capturing condition CI satisfies the predetermined condition Cth without considering the analog gain value GA and the digital gain value GD when the exposure period of time T has reached the maximum exposure period of time Tmax.

Further, in a situation where the vehicle control apparatus 10 is configured as shown in FIG. 2, the vehicle control apparatus 10 may be configured to provide the exposure period of time T from the camera ECU 90C to the main ECU 90M. In this case, the vehicle control apparatus 10 may be configured to determine at the step S515 that the capturing condition CI satisfies the predetermined condition Cth without considering the analog gain value GA and the digital gain value GD when the exposure period of time T has reached the maximum exposure period of time Tmax.

Furthermore, in a situation where the vehicle control apparatus 10 is configured as shown in FIG. 2, the vehicle control apparatus 10 may be configured to provide the maximum exposure information IF_T from the camera ECU 90C to the main ECU 90M. In this case, the vehicle control apparatus 10 may be configured to determine at the step S515 that the capturing condition CI satisfies the predetermined condition Cth without considering the analog gain value GA and the digital gain value GD when the maximum exposure information IF_T has been provided from the camera ECU 90C to the main ECU 90M.

When the vehicle control apparatus 10 determines "Yes" at the step S515, the vehicle control apparatus 10 proceeds with the process to a step S520 to operate the infrared light projection device 40 to project the infrared light from the infrared light projection device 40. Then, the vehicle control apparatus 10 proceeds with the process to a step S595 to terminate executing this routine once.

On the other hand, when the vehicle control apparatus 10 determines "No" at the step S510 or the step S515, the vehicle control apparatus 10 proceeds with the process to a step S525 to stop operating the infrared light projection device 40 when the vehicle control apparatus 10 is operating the infrared light projection device 40. Then, the vehicle control apparatus 10 proceeds with the process to the step S595 to terminate executing this routine once.

The operations of the vehicle control apparatus 10 have been described. With the vehicle control apparatus 10, a necessity of projecting the infrared light is determined based on the capturing condition information IF_CI (i.e., information other than the information acquired from the image itself). Therefore, even when the high-luminance reflective object or the low-luminance reflective object is captured in the image, the infrared light can be projected as needed.

It should be noted that the present invention is not limited to the above-described embodiments, and various modifications can be adopted within the scope of the present invention.

What is claimed is:

1. An infrared light projection control apparatus, comprising an electronic control unit configured to control a projection of infrared light from an infrared light projection device which is mounted on a vehicle and projects the infrared light onto at least a part of a surrounding of the vehicle,
    wherein the electronic control unit is configured to:
        acquire capturing condition information corresponding to information on a capturing condition for capturing the surrounding of the vehicle by a capturing device mounted on the vehicle and acquiring images of the surrounding of the vehicle,
        wherein the capturing condition information corresponds to information on an exposure period of time for which the capturing device captures, and a gain value of the capturing device to acquire the images; and
        project the infrared light from the infrared light projection device when the capturing condition identified by the capturing condition information satisfies a predetermined condition,
        wherein the predetermined condition corresponds to a condition that the exposure period of time has reached a maximum exposure period of time, and the gain value has reached a maximum gain value.

2. The infrared light projection control apparatus as claimed in claim 1,
    wherein the infrared light projection control apparatus comprises a storage device, and
    wherein the maximum exposure period of time and the maximum gain value are stored in the storage device.

3. An infrared light projection control method of controlling a projection of infrared light from an infrared light projection device which is mounted on a vehicle and projects the infrared light onto at least a part of a surrounding of the vehicle, wherein the infrared limit projection control method comprises steps of:

acquiring capturing condition information corresponding to information on a capturing condition for capturing the surrounding of the vehicle by a capturing device mounted on the vehicle and acquiring images of the surrounding of the vehicle, wherein the capturing condition information corresponds to information on an exposure period of time for which the capturing device captures, and a gain value of the capturing device to acquire the images; and projecting the infrared light from the infrared light projection device when the capturing condition identified by the capturing condition information satisfies a predetermined condition, wherein the predetermined condition corresponds to a condition that the exposure period of time has reached a maximum exposure period of time, and the gain value has reached a maximum gain value.

4. A non-transitory computer-readable storage medium storing an infrared light projection control program of controlling a projection of infrared light from an infrared light projection device which is mounted on a vehicle and projects the infrared light onto at least a part of a surrounding of the vehicle, wherein the infrared light projection control program is configured to:

acquire capturing condition information corresponding to information on a capturing condition for capturing the surrounding of the vehicle by a capturing device mounted on the vehicle and acquiring images of the surrounding of the vehicle, wherein the capturing condition information corresponds to information on an exposure period of time for which the capturing device captures, and a gain value of the capturing device to acquire the images; and project the infrared light from the infrared light projection device when the capturing condition identified by the capturing condition information satisfies a predetermined condition, wherein the predetermined condition corresponds to a condition that the exposure period of time has reached a maximum exposure period of time, and the gain value has reached a maximum gain value.

\* \* \* \* \*